Patented Sept. 1, 1931

1,821,705

UNITED STATES PATENT OFFICE

IVAN GUBELMANN, JOSEPH B. OESCH, OF SOUTH MILWAUKEE, AND EMERIC HAVAS, OF MILWAUKEE, WISCONSIN, ASSIGNORS, BY MESNE ASSIGNMENTS, TO NEWPORT CHEMICAL CORPORATION, A CORPORATION OF DELAWARE

BROMINATION PRODUCTS OF 4,4'-DIMETHYL-6,6'-DICHLORO-THIO-INDIGO AND PROCESS OF MAKING THE SAME

No Drawing.   Application filed June 25, 1927.   Serial No. 201,556.

This invention relates to brominated 4.4'-dimethyl-6.6'-dichloro-thio-indigoes, and to a process of making the same.

It is an object of this invention to provide a simple and economical process for preparing brominated 4.4'-dimethyl-6.6'-dichloro-thio-indigoes, which are valuable vat dyes possessing excellent fastness to light and washing.

It is a further object of this invention to provide a method of brominating 4.4'-dimethyl-6.6'-dichloro-thio-indigo whereby considerable economy in the use of bromine may be effected; and whereby varying shades of dyestuffs may be produced depending upon the amount of bromine introduced into the molecule.

Other and further important objects of this invention will become apparent from the following description and appended claims.

While there are described in the literature numerous halogenated thio-indigo dyes, none of them, however, are prepared from 4.4'-dimethyl-6.6'-dichloro-thio-indigo, which we use as our starting material. Our process may be expressed by the following chemical equation, wherein "$x$" represents an indefinite number of atoms and "$y$" represents up to two atoms:

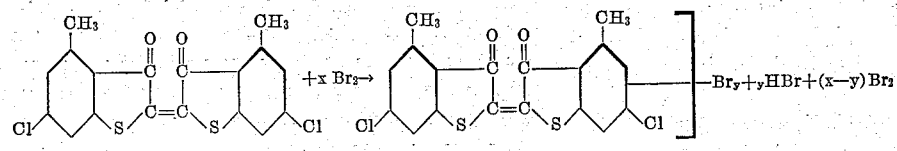

We have discovered that by the careful treatment of 4.4'-dimethyl-6.6'-dichloro-thio-indigo with a brominating agent, there are formed new and valuable vat dyestuffs, varying in shade from a yellowish red to a bluish red, according to the extent to which the bromination is carried.

For example, if 4.4'-dimethyl-6.6'-dichloro-thio-indigo is dissolved in sulphuric acid monohydrate and treated with bromine, new dyestuffs are obtained varying in chemical constitution from mixtures of the original compound and the mono-bromo derivative, to mixtures of the mono-bromo and di-bromo derivatives. We have likewise discovered that if approximately one molecular weight of 4.4'-dimethyl-6.6'-dichloro-thio-indigo is dissolved in sulphuric acid monohydrate and treated with about 1½ atomic weights of bromine, a quantity corresponding to less than the amount hitherto considered theoretically necessary to obtain a mono-brominated product, we obtain a brominated product equivalent in bromine content to a mixture of 96% of the mono-bromo and 4% of the di-bromo derivatives.

This economical use of bromine is the more surprising in view of the fact that the literature, to the best of our knowledge, fails to describe a halogenation process in connection with indigoid compounds, which gives such high efficiency in the use of bromine.

We have further observed that we can alter to a limited extent, the degree of bromination of 4.4'-dimethyl-6.6'-dichloro-thio-indigo by using a constant amount of the brominating agent and changing the concentration of the sulphuric acid. For example, by using 1½ atomic weights of bromine and sulphuric acid stronger than monohydrate, the ratio of dibrominated dye to mono-brominated dye is higher than when using monohydrate, and the shade of the dyestuff is bluer; further, when using a sulphuric acid weaker than monohydrate, dyestuffs result containing a mixture of unbrominated and mono-brominated compounds, with shades yellower than when using monohydrate. This phenomenon of altering the degree of bromination merely by a change in the strength of sulphuric acid used is probably best explained by the fact that in working with sulphuric acid equal in strength to monohydrate, there is an evolution of sulphur dioxide accompanied by an oxidation of liberated hydrobromic acid, thereby resulting in the re-formation of additional bromine usually not available for bromination.

It is therefor obvious from the above description that our process of bromination may be easily manipulated to produce dyestuffs of this type which contain bromine in varying amounts according as the conditions of the bromination process are varied.

While it is difficult to determine the position of the entering bromine atoms, it is apparent that they may enter into any of the four positions, namely, the 5.5' positions or the 7.7' positions.

The bromination products of 4.4'-dimethyl-6.6'-dichloro-thio-indigo vary as to shade, depending upon the amount of bromine introduced into the molecule. They range in shade from a yellowish red to a bluish red, the products containing greater proportions of bromine producing the bluish red shades.

The other general properties of the mixtures are in a large degree similar to the properties of the mono-brominated product, which is herein described in detail. The mono-bromo 4.4'-dimethyl-6.6'-dichloro-thio-indigo is a dark colored powder which is soluble in concentrated sulphuric acid, imparting thereto a greenish color, and can be precipitated therefrom by the addition of water, in the form of a red precipitate. The mono-bromo product is sparingly soluble in acetic acid or alcohol with a reddish coloration, is sparingly soluble in boiling benzene with a reddish violet coloration, but is easily soluble in boiling naphtha or nitro-benzene with a reddish violet coloration and a yellow fluorescence. With alkaline reducing agents such as sodium hydrosulphite, it gives a light yellow vat from which unmordanted cotton is dyed bluish red shades.

Without limiting our invention to any particular procedure, the following example, in which parts by weight are given, will serve to illustrate our method in its preferred form:

50 parts of 4.4'-dimethyl-6.6'-dichloro-thio-indigo are dissolved in 700 parts of sulphuric acid monohydrate, and 15 parts of bromine are introduced at ordinary temperature. This mass is then stirred for about 12 hours and the product is isolated by adding the brominated mass to about 3000 parts of ice water. The precipitation mass is agitated for about one-half hour, filtered and the filter cake washed with water and pasted. The dyestuff obtained in this way corresponds closely in bromine content to the mono-bromo derivative and constitutes in the dry state, a dark powder yielding by treatment with sodium hydrosulphite, a yellow vat from which cotton is dyed a reddish tint.

By following the conditions given in the above example but varying the amount of bromine used or the concentration of sulphuric acid employed, or both, various mixtures of brominated 4.4'-dimethyl-6.6'-dichloro-thio-indigoes may be produced. In general, concentrated sulphuric acid varying in strength from 60° Bé. to Oleum may be employed, the efficiency in the use of the bromine being higher when the higher acid concentrations are used.

We are aware that numerous details of this process may be varied throughout a wide range without departing from the spirit of this invention, and we therefore do not propose to limit the patent granted hereon otherwise than as necessitated by the prior art.

We claim as our invention:

1. A process for preparing brominated 4.4'-dimethyl-6.6'-dichloro-thio-indigo containing substantially less than two bromine atoms to the molecule, which comprises treating 4.4'-dimethyl-6.6'-dichloro-thio-indigo in concentrated sulphuric acid solution with a brominating agent.

2. A process for preparing a brominated 4.4'-dimethyl-6.6'-dichloro-thio-indigo corresponding closely in bromine content to the mono-bromo derivative, which comprises treating 4.4'-dimethyl-6.6'-dichloro-thio-indigo dissolved in concentrated sulphuric acid with a brominating agent.

3. A process for preparing a brominated 4.4'-dimethyl-6.6'-dichloro-thio-indigo corresponding closely in bromine content to the mono-bromo derivative, which comprises treating 4.4'-dimethyl-6.6'-dichloro-thio-indigo dissolved in sulphuric acid monohydrate, with substantially one and one-half atomic weights of bromine.

4. A process of preparing brominated 4.4'-dimethyl-6.6'-dichloro-thio-indigo corresponding closely in bromine content to the mono-bromo derivative, which comprises treating approximately 50 parts by weight of 4.4'-dimethyl-6.6'-dichloro-thio-indigo dissolved in sulphuric acid monohydrate with approximately 15 parts by weight of bromine and diluting the solvent mass to precipitate the product.

5. As a new article of manufacture, a dyestuff containing brominated 4.4'-dimethyl-6.6'-dichloro-thio-indigo, the bromine content being substantially less than that of dibromo-4.4'-dimethyl-6.6'-dichloro-thio-indigo.

6. As a new article of manufacture, a dyestuff containing brominated 4.4'-dimethyl-6.6'-dichloro-thio-indigo corresponding closely to the mono-bromo derivative and having most probably the following formula:
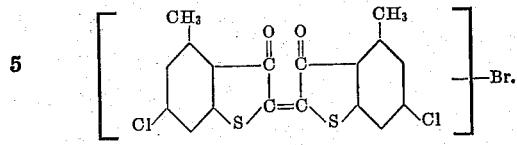
7. Materials dyed with the dyestuff described in claim 5.
8. Materials dyed with the dyestuff described in claim 6.
In testimony whereof we have hereunto subscribed our names.
IVAN GUBELMANN.
J. B. OESCH.
EMERIC HAVAS.